United States Patent [19]

Brook

[11] Patent Number: 5,045,200

[45] Date of Patent: Sep. 3, 1991

[54] APPARATUS AND METHOD OF FILTERING FATTY ACIDS FROM COOKING OIL

[76] Inventor: Edward E. Brook, 6200 N. Drexel Ave., Oklahoma City, Okla. 73112

[21] Appl. No.: 597,629

[22] Filed: Oct. 15, 1990

[51] Int. Cl.⁵ ............................................. B01D 39/08
[52] U.S. Cl. ................................ 210/416.5; 210/261; 210/262; 210/451; 210/453; 210/184; 210/185; 210/777; 210/808; 210/175; 426/417; 426/438; 426/330.6
[58] Field of Search .............................. 426/330.6, 438; 427/417; 210/261, 262, DIG. 8, 777, 416.5, 451, 808, 184, 175, 185

[56] References Cited

U.S. PATENT DOCUMENTS

| | | | |
|---|---|---|---|
| 3,616,907 | 3/1970 | Van Vleet | 210/808 |
| 4,272,371 | 2/1980 | Moses et al. | 210/416.5 |
| 4,913,922 | 4/1990 | Hawkes et al. | 426/438 |
| 4,957,758 | 9/1990 | Drisftholt | 426/330.6 |

Primary Examiner—Robert A. Dawson
Assistant Examiner—Abeer I. Daoud
Attorney, Agent, or Firm—Robert K. Rhea

[57] ABSTRACT

A device for removing free fatty acids from cooking oil is formed by a pair of superposed reservoirs having a screen and filter pad provided partition dividing the reservoirs from each other through which the cooking is forced from the upper reservoir to the lower reservoir by air pressure. A powder commingled with the oil prior to the filtering step is trapped with free fatty acids on the filter pad.

2 Claims, 2 Drawing Sheets

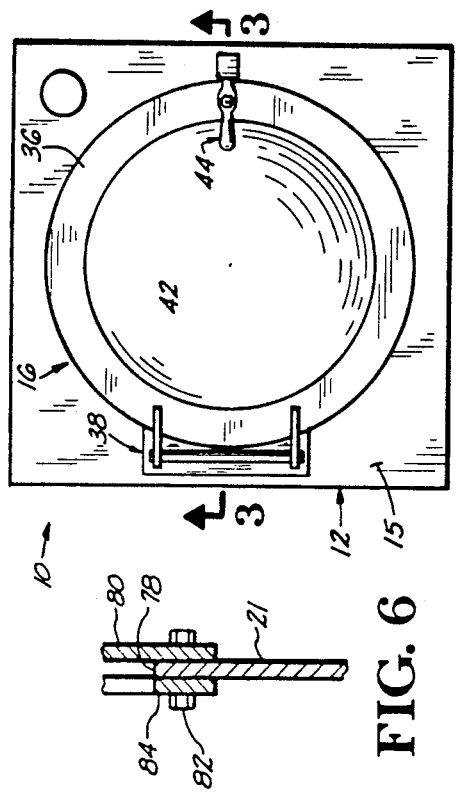
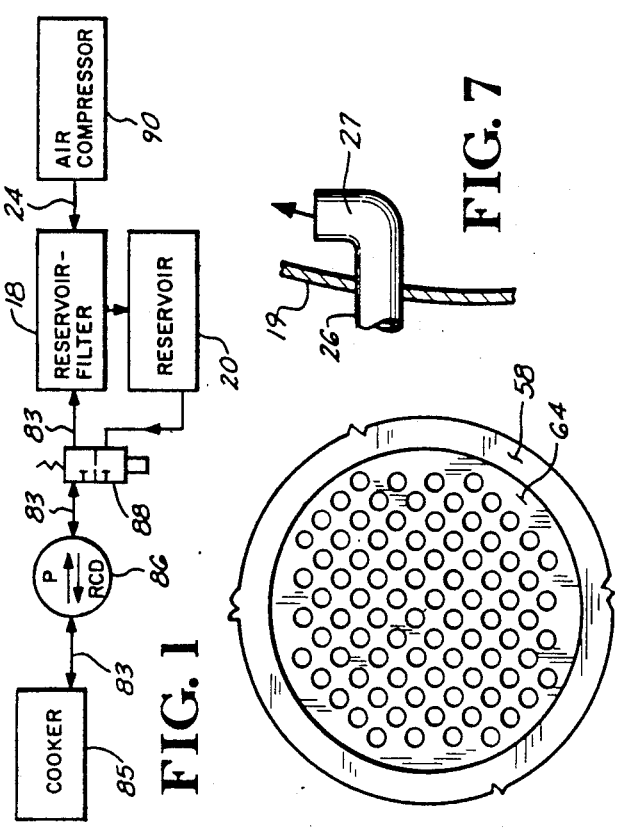
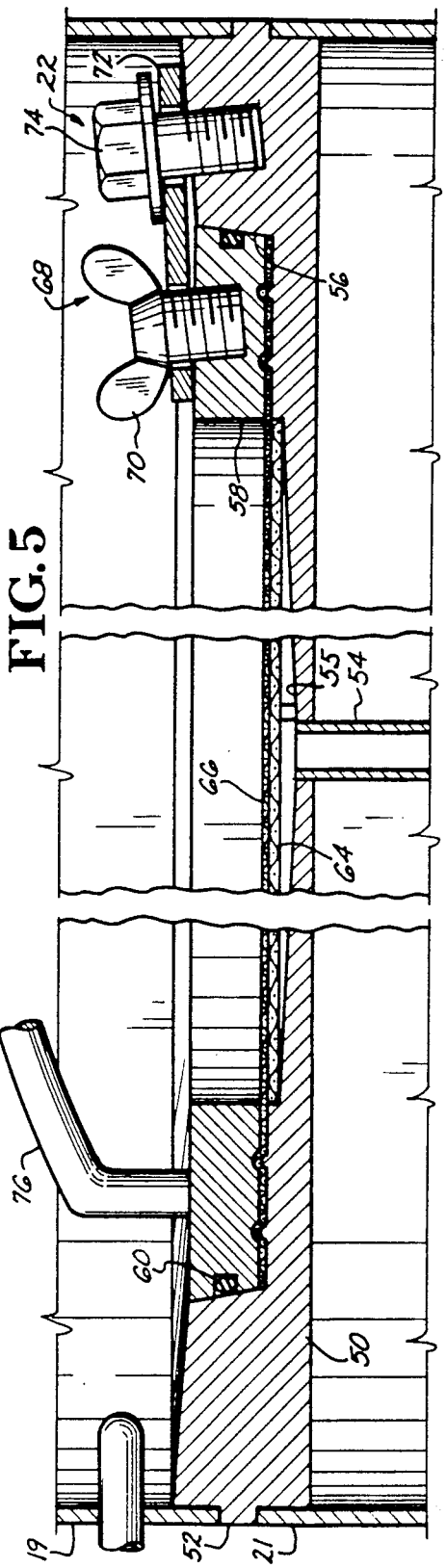

APPARATUS AND METHOD OF FILTERING FATTY ACIDS FROM COOKING OIL

BACKGROUND OF THE INVENTION

1. Field of the Invention

This invention relates to filtering systems and more particularly to an apparatus and method for removing impurities from cooking oil and maintaining its golden color.

The utilization of cooking oil on a repetitive basis results in an accumulation of fatty acids in the oil. Over a period of time, depending upon the quantity of cooking oil and the quantity of food processed therein, the fatty acids accumulate until they produce adverse characteristics on the food prepared in the oil. These adverse characteristics are usually in the form of discoloring the oil, excess grease in the food and an unpalatable taste of the food.

It therefore appears obvious that the cooking oil must be periodically replaced with new oil or some method or apparatus must be provided to remove the free fatty acids therefrom.

Replacing the oil with new oil is not economically satisfactory; this invention provides an apparatus which will efficiently remove the fatty acids from the oil so that it may be reused many times in accordance with regularity of its being filtered with this apparatus.

2. Description of the Prior Art

Several systems have been developed for filtering cooking oil and extending the life of the oil for cooking purposes. Most of these systems, as shown by the prior art, gravity feed the oil through a filter for the purpose of removing large particles from the oil.

This invention is believe distinctive over the prior art by providing a comminuted powder having an affinity for free fatty acids which is added to the oil prior to its being pressure forced through a filter impervious to the powder.

SUMMARY OF THE INVENTION

The cooking oil while sufficiently warm to flow in a liquid state is pumped from a cooker to a reservoir having a heater for maintaining the oil at a desired temperature.

A finely divided powder material, in quantity, 2% by weight of the powder to the amount of cooking oil, is added to the cooking oil prior to its being forced by air under a selected pressure from an upper reservoir through a paper or cloth filter supported by a screen to a lower collecting reservoir also containing a heater for maintaining the oil in a liquid state.

The cleaned and filtered oil is then returned to the cooking vat.

BRIEF DESCRIPTION OF THE DRAWINGS

FIG. 1 is a flow diagram;

FIG. 2 is a top view of the apparatus;

FIG. 4 is a fragmentary top view looking in the direction of the arrows 4—4 of FIG. 3;

FIG. 5 is a fragmentary vertical cross sectional view of the filter portion of the apparatus to a further enlarged scale;

FIG. 6 is a fragmentary vertical cross sectional view, taken substantially along the line 6—6, of FIG. 3; and, FIG. 7 is a fragmentary horizontal cross sectional view, partially in elevation, taken substantially along the line 7—7 of FIG. 3.

DESCRIPTION OF THE PREFERRED EMBODIMENTS

Figure 3:
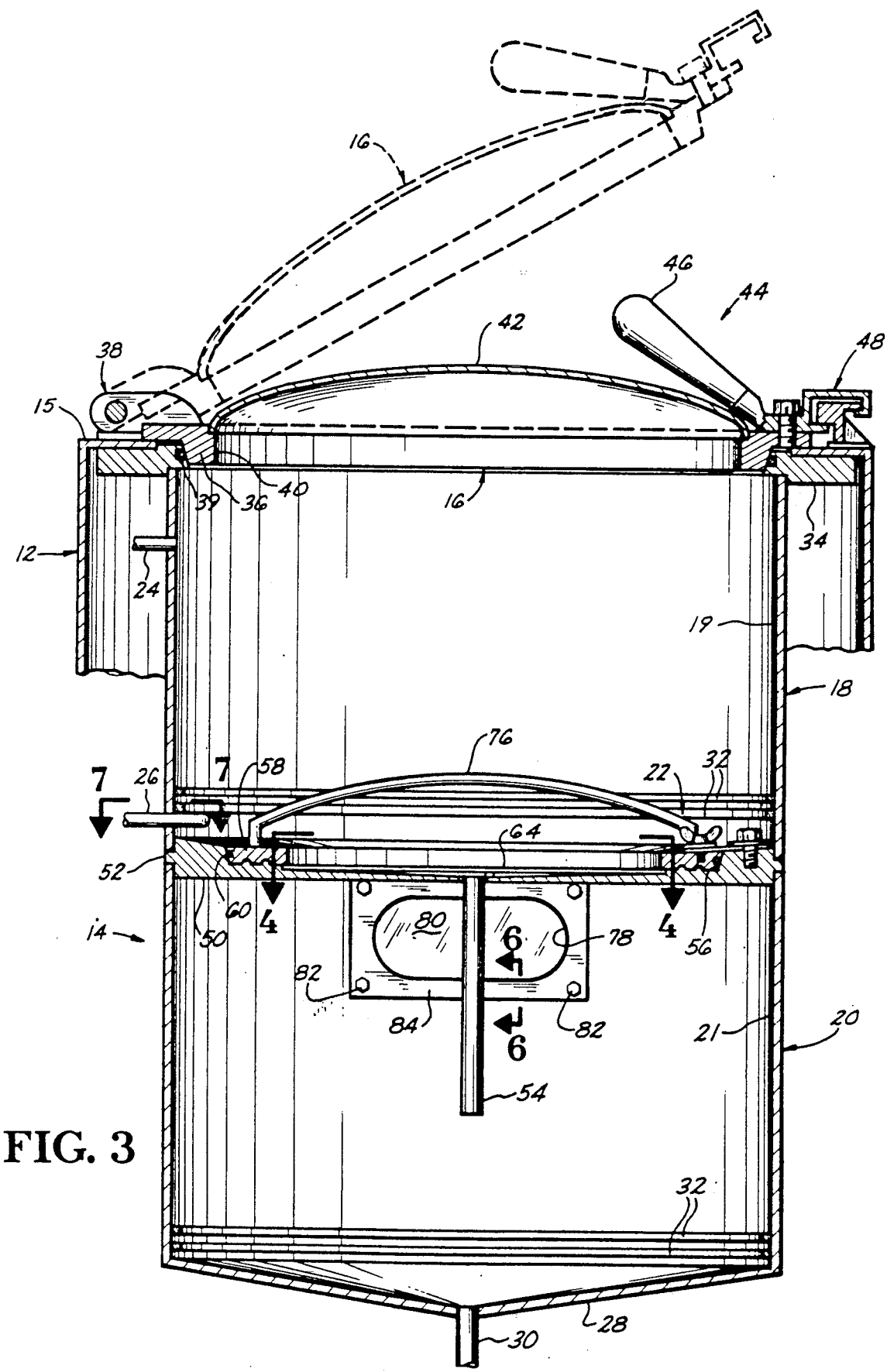
FIG. 3 is a vertical cross sectional view, to a larger scale, taken substantially along the line 3—3 of FIG. 2.

Like characters of reference designate like parts in those figures, of the drawings in which they occur.

In the drawings:

Referring first to FIGS. 2 and 3, the numeral 10 indicates the device as a whole comprising an upright elongated rectangular cabinet 12 surrounding reservoir means 14 having a top lid means 16 for opening and closing the reservoir means.

The cabinet 12 is substantially conventional having four walls and a caster wheel mounted bottom end, not shown, for convenience in moving the device 10 from one location to another in a restaurant or the like. The upper or top end wall 15 of the cabinet surrounds the reservoir lid means 16.

The reservoir means 14 comprises a cylindrical upper or top reservoir 18 having a wall 19 and a bottom or lower cylindrical reservoir 20 having a wall 21 with a partition-type filtering means 22 interposed between the upper and lower reservoirs and supported by the walls thereof. The reservoirs 18 and 20 each have a volume greater than a predetermined quantity of oil to be contained.

The upper reservoir 18 is provided with an air inlet port 24 adjacent its upper limit and a cooking oil inlet port 26 adjacent its lower limit and the filter means 22. The oil inlet tube 26 terminates inwardly of the reservoir wall 19 in a right angular elbow 27 for directing oil toward the inner wall 19 of the reservoir 18 for the purposes presently explained.

The bottom or closed end 28 of the lower reservoir 20 tapers downwardly toward its center and is provided with a drain tube 30.

Adjacent their respective depending limit, each of the reservoirs 18 and 20 are provided with electrical resistance heaters 32 adjacent their inner wall surfaces.

The lid means 16 comprises an annular outer ring 34 overlying and secured to the top end surface of the top reservoir wall 19. The lid means 16 further includes an inner annular ring-like lid 36 hingedly connected by hinge means 38, with an intermediate portion of the top surface of the outer annular ring 34 for vertical pivoting movement of the ring 36 toward and away from the outer ring 34. The outer ring 34 and inner ring 36 having cooperating downwardly converging annular surfaces forming a seat sealed by an O-ring 39 nested by the outer ring 34. The inner ring 36 has its central opening 40 closed by a dome-like lid 42.

Latch means 44 secured to the lid inner ring 36 opposite the hinge means 38 locks the lid in a closed position by a latch-equipped handle 46 engaging a substantially conventional latch means 48 cooperatively mounted on the upper surface cf the outer ring 34 opposite the hinge means 38.

Obviously, additional conventional pressure vessel clamp-like members may be secured to the outer ring 34 to overlie the inner ring 36 to ensure sealing the top reservoir during operation of the device 10 as presently explained.

The filter means 22 comprises a circular horizontal partition member 50 having an annular outstanding flange 52 interposed between the adjacent end edges of the top and bottom reservoir walls 19 and 21, respectively.

The partition 50 is provided with a central aperture and a drain tube 54 depending therefrom.

The partition is centrally counterbored to form a central recess 55, converging downwardly from its perimeter and an annular downwardly converging wall 56 which cooperatively receives a filter ring 58 sealing with an O-ring 60 nested by the recess wall 56.

A rigid screen 64 formed by a foraminated plate (FIG. 4) is nested by the perimeter of the recess 55.

A cloth or fabric filter 66 pervious to cooking oil but impervious to an oil cleaning powder flatly overlies the screen 64 with a portion of its perimeter clamped between the filter ring 58 and partition 50. The filter ring 58 is maintained in place impinging the filter 66 against the partition 50 by a plurality (3), only one being shown, of thumb screw means 68.

The thumb screw means 68 comprises a thumb screw 70 threadedly engaged with the filter ring 58 through a clamp plate 72 pivotally anchored to the partition 50 outwardly of the filter ring 58 by a stud bolt 74. The filter ring 58 is further provided with a handle 76 for disassembly of the filter means 22.

The lower reservoir wall 21 is provided with an access opening 78 closed by a access plate 80 secured to the wall 21 by a plurality of bolts 82 and a access plate ring 84 (FIG. 6).

The oil inlet conduit or tube 26 is connected by tubing with a cooker 85 through a reversible constant delivery pump 86 and a two-way valve 88. The air inlet conduit 24 is connected with an air compressor 90. The lower reservoir drain 30 is connected with the two-way valve 88.

Obviously other conventional controls, not shown, such as electric switches, pressure gauges and/or a pressure relief valve are employed as a part of the system.

Operation

In operation, a source of electrical energy is connected with the controls, heaters 32, pump 86 and air compressor 90.

The cooking oil contained by the cooker 85 is transferred to the upper reservoir 18 by the pump 86 through the two-way valve 88 (FIG. 1). A predetermined quantity of comminuted powder, not shown, having an affinity for free fatty acids is poured into the cooking oil while the oil is in a liquid state. The ratio of powder to cooking oil is 2% by weight of the powder to the amount of cooking oil being filtered. For example, one pound of powder to fifty pounds of oil.

The cooking oil and powder is thoroughly mixed in the reservior 18 to insure contact between the free fatty acids and the powder. With the lid means 16 closed and locked in place, air pressure of approximately 15 psig is generated by the compressor 90 in the space or chamber of the reservoir 18 above the oil therein.

The heater 32 maintains the oil in a liquid state and air pressure forces the oil through the filter 66 and screen 64 into the lower reservoir 20. The free fatty acids/comminuted powder mixtures with other oil color altering ingredients remaining on the filter 66. The clean oil is then pumped to the cooker 85 by the pump 86 through the two-way valve 88, thus completing one cycle of operation.

Obviously the invention is susceptible to changes or alterations without defeating its practicability. Therefore, I do not wish to be confined to the preferred embodiment shown in the drawings and described herein.

I claim:

1. Apparatus for filtering free fatty acids and oil discoloring ingredients from liquid cooking oil containing a comminuted powder having an affinity for free fatty acids on the ratio of 2% by weight of the powder to the amount of oil being filtered, the improvement comprising:

a cooker normally containing the oil;
   an upright first reservoir having a wall and having vertically spaced wall inlet ports;
   a lid for closing the first reservoir;
   an upright second reservoir extending downwardly from said first reservoir,
      said second reservoir having a bottom wall and a liquid outlet port;
   pump and tubing means transferring the oil from the cooker to the first reservoir;
   filter means interposed between the reservoirs including a screen and a filter pad pervious to the oil and impervious to a mixture of the powder and free fatty acids overlying the screen; and,
   other pump and tubing means for generating air pressure of predetermined value in the first reservoir for forcing only the cooking oil once through the filter pad.

2. The apparatus according to claim 1 and further including:

heater means adjacent the perimeter of each said reservoir for maintaining the oil in a liquid state.

* * * * *